(12) United States Patent
Chaji et al.

(10) Patent No.: US 10,650,742 B2
(45) Date of Patent: *May 12, 2020

(54) PIXEL CIRCUITS FOR AMOLED DISPLAYS

(71) Applicant: Ignis Innovation Inc., Waterloo (CA)

(72) Inventors: Gholamreza Chaji, Waterloo (CA); Yaser Azizi, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,557

(22) Filed: Feb. 4, 2019

(65) Prior Publication Data

US 2019/0180684 A1 Jun. 13, 2019

Related U.S. Application Data

(63) Continuation of application No. 15/903,698, filed on Feb. 23, 2018, now Pat. No. 10,242,619, which is a
(Continued)

(51) Int. Cl.
*G09G 3/3233* (2016.01)
*G06F 1/3218* (2019.01)
*G06F 1/3234* (2019.01)

(52) U.S. Cl.
CPC ......... *G09G 3/3233* (2013.01); *G06F 1/3218* (2013.01); *G06F 1/3265* (2013.01); *G09G 2300/0426* (2013.01); *G09G 2300/0465* (2013.01); *G09G 2300/0819* (2013.01); *G09G 2300/0842* (2013.01); *G09G 2300/0861* (2013.01); *G09G 2300/0866* (2013.01); *G09G 2310/08* (2013.01); *G09G 2320/0295* (2013.01); *G09G 2320/043* (2013.01); *G09G 2320/045* (2013.01); *G09G 2320/048* (2013.01); *G09G 2320/0613* (2013.01); *G09G 2320/0626* (2013.01); *G09G 2320/0693* (2013.01); *G09G 2330/021* (2013.01); *G09G 2330/022* (2013.01);
(Continued)

(58) Field of Classification Search
None
See application file for complete search history.

(56) References Cited

U.S. PATENT DOCUMENTS 10,242,619 B2 * 3/2019 Chaji .................... G06F 1/3218
2008/0315788 A1 12/2008 Levey et al.
(Continued)

FOREIGN PATENT DOCUMENTS

EP 2133860 A1 12/2009
EP 2383720 A2 11/2011

OTHER PUBLICATIONS

EESR from corresponding EP application No. 18205133, Mar. 19, 2019.

*Primary Examiner* — Kenneth B Lee, Jr.
(74) *Attorney, Agent, or Firm* — Stratford Managers Corporation

(57) ABSTRACT

A system for driving a display that includes a plurality of pixel circuits arranged in an array, each of the pixel circuits including a light emitting device and a driving transistor for conveying a driving current through the light emitting device. Methods of measuring characteristics of circuit elements of pixels sharing a monitor line include the control of biasing to selectively turn off circuit elements or render their response known while measuring other circuit elements of interest.

14 Claims, 11 Drawing Sheets

Related U.S. Application Data continuation of application No. 15/635,653, filed on Jun. 28, 2017, now Pat. No. 9,934,725, which is a continuation of application No. 15/184,233, filed on Jun. 16, 2016, now Pat. No. 9,721,505, which is a continuation-in-part of application No. 14/491,763, filed on Sep. 19, 2014, now Pat. No. 9,886,899, which is a continuation-in-part of application No. 14/474,977, filed on Sep. 2, 2014, now abandoned, which is a continuation-in-part of application No. 13/789,978, filed on Mar. 8, 2013, now Pat. No. 9,351,368.

(52) U.S. Cl.
CPC ............... *G09G 2330/023* (2013.01); *G09G 2340/0435* (2013.01); *G09G 2360/12* (2013.01); *G09G 2360/18* (2013.01); *Y02D 10/153* (2018.01)

(56) References Cited

U.S. PATENT DOCUMENTS

| | | |
|---|---|---|
| 2009/0295423 A1 | 12/2009 | Levey |
| 2010/0103082 A1 | 4/2010 | Levey et al. |
| 2010/0103159 A1 | 4/2010 | Leon |
| 2011/0205250 A1 | 8/2011 | Yoo et al. |
| 2012/0299978 A1 | 11/2012 | Chaji |

* cited by examiner

PIXEL CIRCUITS FOR AMOLED DISPLAYS

CROSS REFERENCE TO RELATED APPLICATIONS

This application is a continuation of U.S. patent application Ser. No. 15/903,698, filed Feb. 23, 2018, now allowed, which is a continuation of U.S. patent application Ser. No. 15/635,653, filed Jun. 28, 2017, now allowed, which is a continuation of U.S. patent application Ser. No. 15/184,233, filed Jun. 16, 2016, now U.S. Pat. No. 9,721,505, which claims priority to Canadian Application No. 2,894,717, filed Jun. 19, 2015, and is a continuation-in-part of and claims the benefit of U.S. patent application Ser. No. 14/491,763, filed Sep. 19, 2014, now U.S. Pat. No. 9,886,899, which is a continuation-in-part of U.S. patent application Ser. No. 14/474,977, filed Sep. 2, 2014, which is a continuation-in-part of U.S. patent application Ser. No. 13/789,978, filed Mar. 8, 2013, now U.S. Pat. No. 9,351,368, each of which is hereby incorporated by reference herein in its entirety.

FIELD OF THE INVENTION

The present disclosure generally relates to circuits for use in displays, and methods of driving, calibrating, and programming displays, particularly displays such as active matrix organic light emitting diode displays.

BACKGROUND

Displays can be created from an array of light emitting devices each controlled by individual circuits (i.e., pixel circuits) having transistors for selectively controlling the circuits to be programmed with display information and to emit light according to the display information. Thin film transistors ("TFTs") fabricated on a substrate can be incorporated into such displays. TFTs tend to demonstrate non-uniform behavior across display panels and over time as the displays age. Compensation techniques can be applied to such displays to achieve image uniformity across the displays and to account for degradation in the displays as the displays age.

Some schemes for providing compensation to displays to account for variations across the display panel and over time utilize monitoring systems to measure time dependent parameters associated with the aging (i.e., degradation) of the pixel circuits. The measured information can then be used to inform subsequent programming of the pixel circuits so as to ensure that any measured degradation is accounted for by adjustments made to the programming. Such monitored pixel circuits may require the use of additional transistors and/or lines to selectively couple the pixel circuits to the monitoring systems and provide for reading out information. The incorporation of additional transistors and/or lines may undesirably decrease pixel-pitch (i.e., "pixel density").

SUMMARY

In accordance with one aspect, there is provided a method of determining characteristics of at least one circuit element of at least one selected pixel in an array of pixels in a display in which each pixel includes a drive transistor for supplying current to an optoelectronic device of the pixel, the method comprising: controlling a biasing of a selected pixel of the at least one selected pixel including a biasing over a monitor line coupled to the selected pixel; controlling a biasing of a first drive transistor; of a first pixel such that a first optoelectronic device of said first pixel is biased so that the first optoelectronic device is turned off, the first pixel sharing the monitor line with the selected pixel; and measuring at least one characteristic of the at least one circuit element of said selected pixel with use of said monitor line.

In some embodiments, one of a source and a drain terminal of the first drive transistor is coupled to the first optoelectronic device and the other of the source and drain terminal of the first drive transistor is coupled to a first supply voltage, and wherein the monitor line is coupled via a first source switch to a first node of the first pixel, the first node between the optoelectronic device and the one of a source and a drain terminal of the first drive transistor, and controlling a biasing of the first drive transistor of the first pixel comprises adjusting at least a voltage of the first supply voltage and a gate terminal of the first drive transistor to ensure the first optoelectronic device is off.

In accordance with another aspect, there is provided a method of determining the characteristics of circuit elements of at least one selected pixel in an array of pixels in a display in which each pixel includes a drive transistor for supplying current to an optoelectronic device of the pixel, the method comprising: controlling a biasing of a selected pixel of the at least one selected pixel, said biasing including a biasing over a monitor line coupled to the selected pixel; controlling a biasing of a first pixel coupled to the monitor line via source and drain terminals of a first source switch such that the first source switch is biased with at least one of a zero voltage and a fixed known voltage across the source and the drain terminal of the first source switch resulting in a corresponding one of a zero current and a fixed known current passing through the first source switch, the monitor line shared with the selected pixel; and measuring at least one characteristic of at least one circuit element of said selected pixel with use of said monitor line.

In some embodiments, measuring at least one characteristic of at least one circuit element of said selected pixel comprises measuring the current of the selected optoelectronic device by measuring a current over the monitor line. In some embodiments, measuring at least one characteristic of at least one circuit element of said selected pixel further comprises subtracting a value of the fixed known current from the current measured over the monitor line.

In some embodiments, one of a source and a drain terminal of the first drive transistor is coupled to the first optoelectronic device and the other of the source and drain terminal of the first drive transistor is coupled to a first supply voltage, and wherein one of the source and the drain terminal of the first source switch is coupled to a first node of the first pixel between the optoelectronic device and the one of a source and a drain terminal of the first drive transistor, and the other of the source and the drain terminal of the first source switch is coupled to the monitor line, wherein controlling a biasing of the first pixel comprises biasing a gate of the first drive transistor to turn the first drive transistor on and adjusting a biasing over the monitor line to one of a voltage equal the voltage of the supply voltage and a voltage different from the voltage of the supply voltage by the fixed known voltage, and wherein biasing of the selected pixel comprises biasing a gate of the selected drive transistor to turn the selected drive transistor off.

In accordance with a further aspect there is provided a method of determining characteristics of at least one circuit element of at least one selected pixel sharing a monitor line, said selected pixels in an array of pixels in a display in which each pixel includes a drive transistor for supplying current to an optoelectronic device of the pixel, the method comprising: controlling a biasing of a first number of selected pixels of the at least one selected pixel, each selected pixel including a second number of circuit elements of the at least one circuit element, the biasing including a biasing over a monitor line coupled to the first number of selected pixels, the controlling the biasing of the first number of selected pixels having a total number of degrees of freedom of biasing greater than or equal to the product of the first number multiplied by the second number; and measuring with use of said monitor line at least one characteristic of the second number of circuit elements of the first number of selected pixels, while controlling a biasing of a first number of selected pixels, taking at least a number of measurements equal to the product of the first number multiplied by the second number.

In accordance with another further aspect there is provided a method of determining the characteristics of circuit elements of at least one selected pixel in an array of pixels in a display in which each pixel includes a drive transistor for supplying current to an optoelectronic device of the pixel, the method comprising: controlling a biasing of a selected pixel of the at least one selected pixel, said biasing including adjusting a biasing of a gate of a selected drive transistor of the selected pixel until a specific current passes through a selected source switch coupling the selected pixel to a monitor line; controlling a biasing of a first pixel coupled to the monitor line via source and drain terminals of a first source switch such that the first source switch is biased with at least one of a zero voltage and a fixed known voltage across the source and the drain terminal of the first source switch resulting in a corresponding one of a zero current and a fixed known current passing through the first source switch, the monitor line shared with the selected pixel; and measuring at least one characteristic of at least one circuit element of said selected pixel with use of said monitor line.

In some embodiments, the controlling of the biasing of the selected pixel comprises adjusting a voltage applied to the gate of the selected drive transistor until a predetermined current through the selected source switch of the selected pixel is measured over the monitor line, the method further comprising determining a change in characteristics of a selected optoelectronic device of the at least one selected pixel with use of a value of the voltage applied to the gate of the selected drive transistor.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
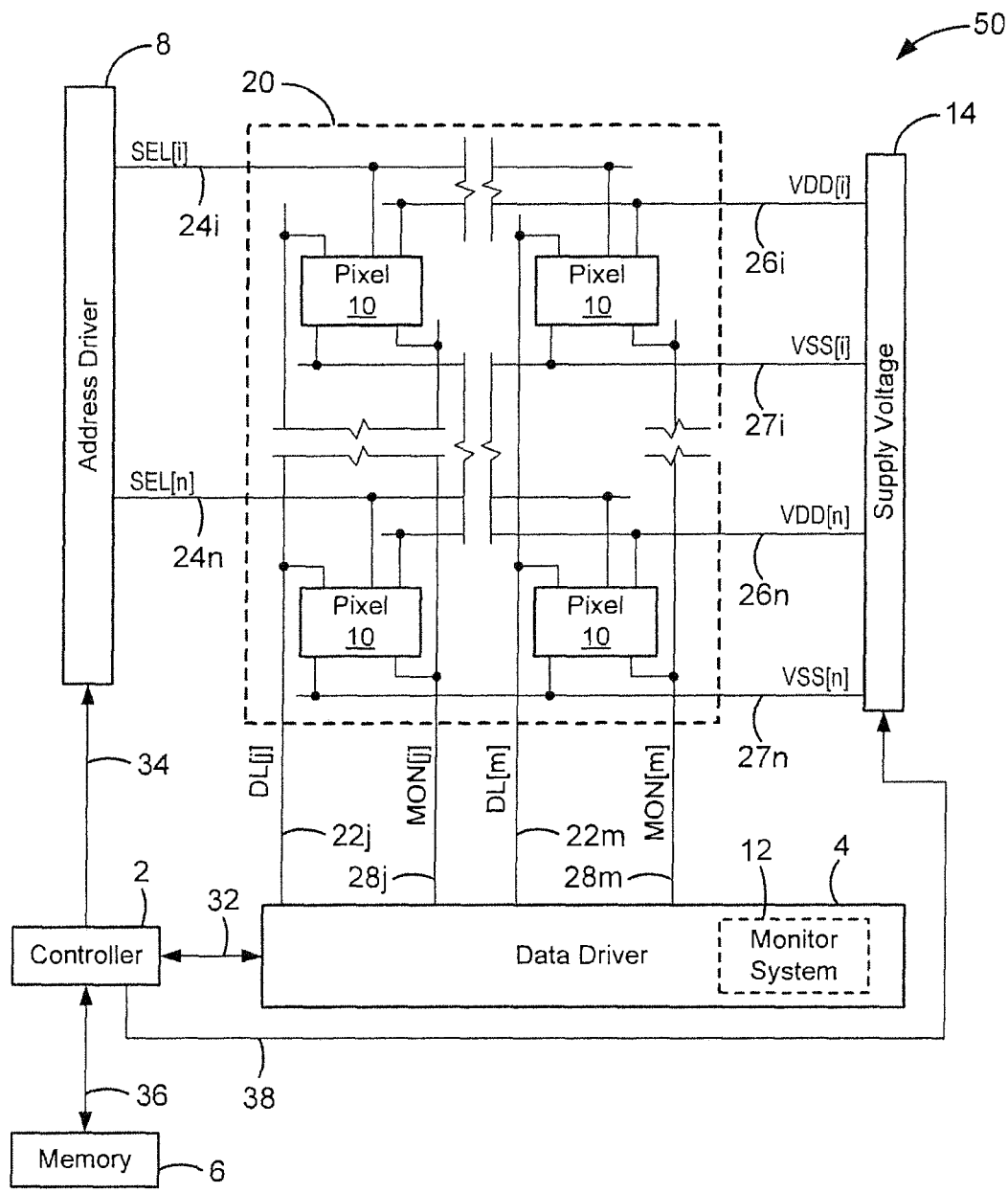
FIG. 1 is a block diagram of an exemplary configuration of a system for driving an OLED display while monitoring the degradation of the individual pixels and providing compensation therefor.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is a diagram of an exemplary display system 50. The display system 50 includes an address driver 8, a data driver 4, a controller 2, a memory storage 6, and display panel 20. The display panel 20 includes an array of pixels 10 arranged in rows and columns. Each of the pixels 10 is individually programmable to emit light with individually programmable luminance values. The controller 2 receives digital data indicative of information to be displayed on the display panel 20. The controller 2 sends signals 32 to the data driver 4 and scheduling signals 34 to the address driver 8 to drive the pixels 10 in the display panel 20 to display the information indicated. The plurality of pixels 10 associated with the display panel 20 thus comprise a display array ("display screen") adapted to dynamically display information according to the input digital data received by the controller 2. The display screen can display, for example, video information from a stream of video data received by the controller 2. The supply voltage 14 can provide a constant power voltage or can be an adjustable voltage supply that is controlled by signals from the controller 2. The display system 50 can also incorporate features from a current source or sink (not shown) to provide biasing currents to the pixels 10 in the display panel 20 to thereby decrease programming time for the pixels 10.

For illustrative purposes, the display system 50 in FIG. 1 is illustrated with only four pixels 10 in the display panel 20. It is understood that the display system 50 can be implemented with a display screen that includes an array of similar pixels, such as the pixels 10, and that the display screen is not limited to a particular number of rows and columns of pixels. For example, the display system 50 can be implemented with a display screen with a number of rows and columns of pixels commonly available in displays for mobile devices, monitor-based devices, and/or projection-devices.

The pixel 10 is operated by a driving circuit ("pixel circuit") that generally includes a driving transistor and a light emitting device. Hereinafter the pixel 10 may refer to the pixel circuit. The light emitting device can optionally be an organic light emitting diode, but implementations of the present disclosure apply to pixel circuits having other electroluminescence devices, including current-driven light emitting devices. The driving transistor in the pixel 10 can optionally be an n-type or p-type amorphous silicon thin-film transistor, but implementations of the present disclosure are not limited to pixel circuits having a particular polarity of transistor or only to pixel circuits having thin-film transistors. The pixel circuit 10 can also include a storage capacitor for storing programming information and allowing the pixel circuit 10 to drive the light emitting device after being addressed. Thus, the display panel 20 can be an active matrix display array.

As illustrated in FIG. 1, the pixel 10 illustrated as the top-left pixel in the display panel 20 is coupled to a select line 24$i$, a supply line 26$i$, a data line 22$j$, and a monitor line 28$j$. A read line may also be included for controlling connections to the monitor line. In one implementation, the supply voltage 14 can also provide a second supply line to the pixel 10. For example, each pixel can be coupled to a first supply line 26 charged with Vdd and a second supply line 27 coupled with Vss, and the pixel circuits 10 can be situated between the first and second supply lines to facilitate driving current between the two supply lines during an emission phase of the pixel circuit. The top-left pixel 10 in the display panel 20 can correspond a pixel in the display panel in a "ith" row and "jth" column of the display panel 20. Similarly, the top-right pixel 10 in the display panel 20 represents a "jth" row and "mth" column; the bottom-left pixel 10 represents an "nth" row and "jth" column; and the bottom-right pixel 10 represents an "nth" row and "mth" column. Each of the pixels 10 is coupled to appropriate select lines (e.g., the select lines 24$i$ and 24$n$), supply lines (e.g., the supply lines 26$i$ and 26$n$), data lines (e.g., the data lines 22$j$ and 22$m$), and monitor lines (e.g., the monitor lines 28$j$ and 28$m$). It is noted that aspects of the present disclosure apply to pixels having additional connections, such as connections to additional select lines, and to pixels having fewer connections, such as pixels lacking a connection to a monitoring line.

With reference to the top-left pixel 10 shown in the display panel 20, the select line 24$i$ is provided by the address driver 8, and can be utilized to enable, for example, a programming operation of the pixel 10 by activating a switch or transistor to allow the data line 22$j$ to program the pixel 10. The data line 22$j$ conveys programming information from the data driver 4 to the pixel 10. For example, the data line 22$j$ can be utilized to apply a programming voltage or a programming current to the pixel 10 in order to program the pixel 10 to emit a desired amount of luminance. The programming voltage (or programming current) supplied by the data driver 4 via the data line 22$j$ is a voltage (or current) appropriate to cause the pixel 10 to emit light with a desired amount of luminance according to the digital data received by the controller 2. The programming voltage (or programming current) can be applied to the pixel 10 during a programming operation of the pixel 10 so as to charge a storage device within the pixel 10, such as a storage capacitor, thereby enabling the pixel 10 to emit light with the desired amount of luminance during an emission operation following the programming operation. For example, the storage device in the pixel 10 can be charged during a programming operation to apply a voltage to one or more of a gate or a source terminal of the driving transistor during the emission operation, thereby causing the driving transistor to convey the driving current through the light emitting device according to the voltage stored on the storage device.

Generally, in the pixel 10, the driving current that is conveyed through the light emitting device by the driving transistor during the emission operation of the pixel 10 is a current that is supplied by the first supply line 26$i$ and is drained to a second supply line 27$i$. The first supply line 26$i$ and the second supply line 27$i$ are coupled to the voltage supply 14. The first supply line 26$i$ can provide a positive supply voltage (e.g., the voltage commonly referred to in circuit design as "Vdd") and the second supply line 27$i$ can provide a negative supply voltage (e.g., the voltage commonly referred to in circuit design as "Vss"). Implementations of the present disclosure can be realized where one or the other of the supply lines (e.g., the supply line 27$i$) is fixed at a ground voltage or at another reference voltage.

The display system 50 also includes a monitoring system 12. With reference again to the top left pixel 10 in the display panel 20, the monitor line 28$j$ connects the pixel 10 to the monitoring system 12. The monitoring system 12 can be integrated with the data driver 4, or can be a separate stand-alone system. In particular, the monitoring system 12 can optionally be implemented by monitoring the current and/or voltage of the data line 22$j$ during a monitoring operation of the pixel 10, and the monitor line 28$j$ can be entirely omitted. Additionally, the display system 50 can be implemented without the monitoring system 12 or the monitor line 28$j$. The monitor line 28$j$ allows the monitoring system 12 to measure a current or voltage associated with the pixel 10 and thereby extract information indicative of a degradation of the pixel 10. For example, the monitoring system 12 can extract, via the monitor line 28$j$, a current flowing through the driving transistor within the pixel 10 and thereby determine, based on the measured current and based on the voltages applied to the driving transistor during the measurement, a threshold voltage of the driving transistor or a shift thereof.

The monitoring system 12 can also extract an operating voltage of the light emitting device (e.g., a voltage drop across the light emitting device while the light emitting device is operating to emit light). The monitoring system 12 can then communicate signals 32 to the controller 2 and/or the memory 6 to allow the display system 50 to store the extracted degradation information in the memory 6. During subsequent programming and/or emission operations of the pixel 10, the degradation information is retrieved from the memory 6 by the controller 2 via memory signals 36, and the controller 2 then compensates for the extracted degradation information in subsequent programming and/or emission operations of the pixel 10. For example, once the degradation information is extracted, the programming information conveyed to the pixel 10 via the data line 22$j$ can be appropriately adjusted during a subsequent programming operation of the pixel 10 such that the pixel 10 emits light with a desired amount of luminance that is independent of the degradation of the pixel 10. In an example, an increase in the threshold voltage of the driving transistor within the pixel 10 can be compensated for by appropriately increasing the programming voltage applied to the pixel 10.

Figure 2A:
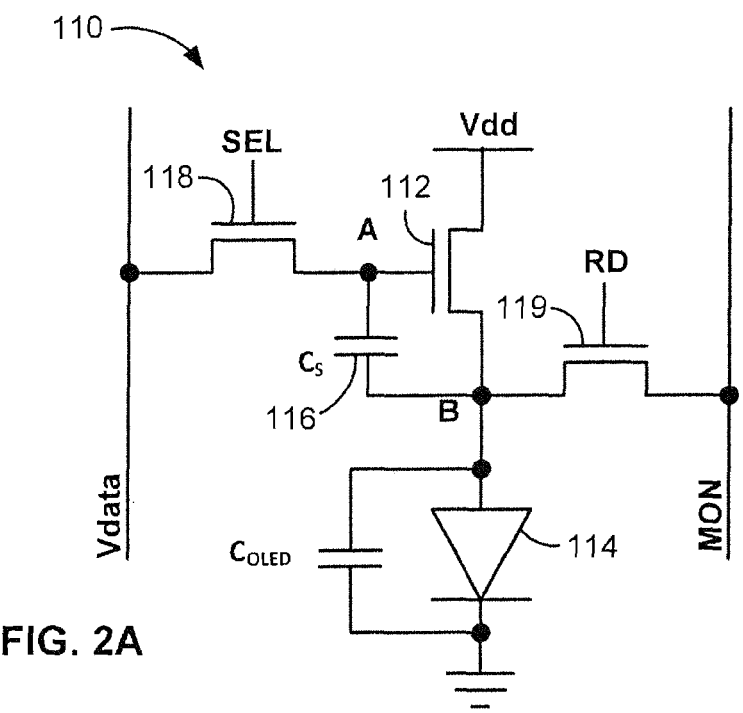
FIG. 2A is a circuit diagram of an exemplary pixel circuit configuration.

FIG. 2A is a circuit diagram of an exemplary driving circuit for a pixel 110. The driving circuit shown in FIG. 2A is utilized to calibrate, program and drive the pixel 110 and includes a drive transistor 112 for conveying a driving current through an organic light emitting diode ("OLED") 114. The OLED 114 emits light according to the current passing through the OLED 114, and can be replaced by any current-driven light emitting device. The OLED 114 has an inherent capacitance $C_{OLED}$. The pixel 110 can be utilized in the display panel 20 of the display system 50 described in connection with FIG. 1.

The driving circuit for the pixel 110 also includes a storage capacitor 116 and a switching transistor 118. The pixel 110 is coupled to a select line SEL, a voltage supply line Vdd, a data line Vdata, and a monitor line MON. The driving transistor 112 draws a current from the voltage supply line Vdd according to a gate-source voltage (Vgs) across the gate and source terminals of the drive transistor 112. For example, in a saturation mode of the drive transistor 112, the current passing through the drive transistor 112 can be given by $Ids=\beta (Vgs-Vt)^2$, where $\beta$ is a parameter that depends on device characteristics of the drive transistor 112, Ids is the current from the drain terminal to the source terminal of the drive transistor 112, and Vt is the threshold voltage of the drive transistor 112.

In the pixel 110, the storage capacitor 116 is coupled across the gate and source terminals of the drive transistor 112. The storage capacitor 116 has a first terminal, which is referred to for convenience as a gate-side terminal, and a second terminal, which is referred to for convenience as a source-side terminal. The gate-side terminal of the storage capacitor 116 is electrically coupled to the gate terminal of the drive transistor 112. The source-side terminal 116s of the storage capacitor 116 is electrically coupled to the source terminal of the drive transistor 112. Thus, the gate-source voltage Vgs of the drive transistor 112 is also the voltage charged on the storage capacitor 116. As will be explained further below, the storage capacitor 116 can thereby maintain a driving voltage across the drive transistor 112 during an emission phase of the pixel 110.

The drain terminal of the drive transistor 112 is connected to the voltage supply line Vdd, and the source terminal of the drive transistor 112 is connected to (1) the anode terminal of the OLED 114 and (2) a monitor line MON via a read transistor 119. A cathode terminal of the OLED 114 can be connected to ground or can optionally be connected to a second voltage supply line, such as the supply line Vss shown in FIG. 1. Thus, the OLED 114 is connected in series with the current path of the drive transistor 112. The OLED 114 emits light according to the magnitude of the current passing through the OLED 114, once a voltage drop across the anode and cathode terminals of the OLED achieves an operating voltage ($V_{OLED}$) of the OLED 114. That is, when the difference between the voltage on the anode terminal and the voltage on the cathode terminal is greater than the operating voltage $V_{OLED}$, the OLED 114 turns on and emits light. When the anode-to-cathode voltage is less than $V_{OLED}$, current does not pass through the OLED 114.

The switching transistor 118 is operated according to the select line SEL (e.g., when the voltage on the select line SEL is at a high level, the switching transistor 118 is turned on, and when the voltage SEL is at a low level, the switching transistor is turned off). When turned on, the switching transistor 118 electrically couples node A (the gate terminal of the driving transistor 112 and the gate-side terminal of the storage capacitor 116) to the data line Vdata.

The read transistor 119 is operated according to the read line RD (e.g., when the voltage on the read line RD is at a high level, the read transistor 119 is turned on, and when the voltage RD is at a low level, the read transistor 119 is turned off). When turned on, the read transistor 119 electrically couples node B (the source terminal of the driving transistor 112, the source-side terminal of the storage capacitor 116, and the anode of the OLED 114) to the monitor line MON.

Figure 2B:
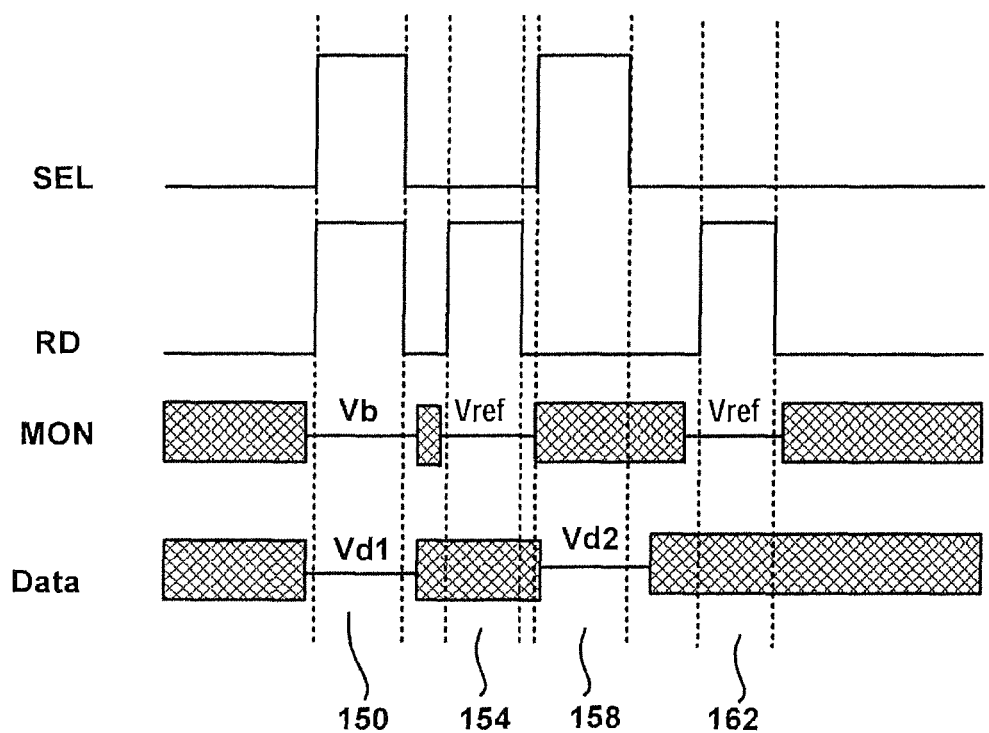
FIG. 2B is a timing diagram of first exemplary operation cycles for the pixel shown in FIG. 2A.

FIG. 2B is a timing diagram of exemplary operation cycles for the pixel 110 shown in FIG. 2A. During a first cycle 150, both the SEL line and the RD line are high, so the corresponding transistors 118 and 119 are turned on. The switching transistor 118 applies a voltage Vd1, which is at a level sufficient to turn on the drive transistor 112, from the data line Vdata to node A. The read transistor 119 applies a monitor-line voltage Vb, which is at a level that turns the OLED 114 off, from the monitor line MON to node B. As a result, the gate-source voltage Vgs is independent of $V_{OLED}$ (Vd1−Vb−Vds3, where Vds3 is the voltage drop across the read transistor 119). The SEL and RD lines go low at the end of the cycle 150, turning off the transistors 118 and 119.

During the second cycle 154, the SEL line is low to turn off the switching transistor 118, and the drive transistor 112 is turned on by the charge on the capacitor 116 at node A. The voltage on the read line RD goes high to turn on the read transistor 119 and thereby permit a first sample of the drive transistor current to be taken via the monitor line MON, while the OLED 114 is off. The voltage on the monitor line MON is Vref, which may be at the same level as the voltage Vb in the previous cycle.

During the third cycle 158, the voltage on the select line SEL is high to turn on the switching transistor 118, and the voltage on the read line RD is low to turn off the read transistor 119. Thus, the gate of the drive transistor 112 is charged to the voltage Vd2 of the data line Vdata, and the source of the drive transistor 112 is set to $V_{OLED}$ by the OLED 114. Consequently, the gate-source voltage Vgs of the drive transistor 112 is a function of $V_{OLED}$ (Vgs=Vd2−$V_{OLED}$).

During the fourth cycle 162, the voltage on the select line SEL is low to turn off the switching transistor, and the drive transistor 112 is turned on by the charge on the capacitor 116 at node A. The voltage on the read line RD is high to turn on the read transistor 119, and a second sample of the current of the drive transistor 112 is taken via the monitor line MON.

If the first and second samples of the drive current are not the same, the voltage Vd2 on the Vdata line is adjusted, the programming voltage Vd2 is changed, and the sampling and adjustment operations are repeated until the second sample of the drive current is the same as the first sample. When the two samples of the drive current are the same, the two gate-source voltages should also be the same, which means that:

$$\begin{aligned}V_{OLED} &= Vd2 - Vgs \\ &= Vd2 - (Vd1 - Vb - Vds3) \\ &= Vd2 - Vd1 + Vb + Vds3.\end{aligned}$$

After some operation time (t), the change in $V_{OLED}$ between time 0 and time t is $\Delta V_{OLED} = V_{OLED}(t) - V_{OLED}(0) = Vd2(t) - Vd2(0)$. Thus, the difference between the two programming voltages $Vd2(t)$ and $Vd2(0)$ can be used to extract the OLED voltage.

Figure 2C:
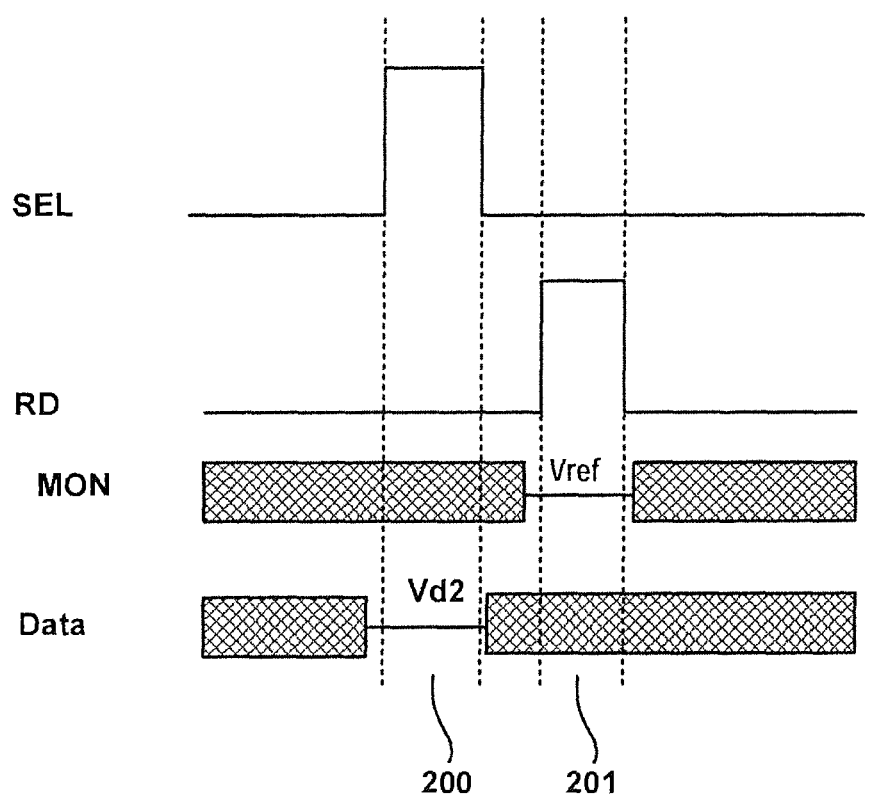
FIG. 2C is a timing diagram of second exemplary operation cycles for the pixel shown in FIG. 2A.

FIG. 2C is a modified schematic timing diagram of another set of exemplary operation cycles for the pixel 110 shown in FIG. 2A, for taking only a single reading of the drive current and comparing that value with a known reference value. For example, the reference value can be the desired value of the drive current derived by the controller to compensate for degradation of the drive transistor 112 as it ages. The OLED voltage $V_{OLED}$ can be extracted by measuring the difference between the pixel currents when the pixel is programmed with fixed voltages in both methods (being affected by $V_{OLED}$ and not being affected by $V_{OLED}$). This difference and the current-voltage characteristics of the pixel can then be used to extract $V_{OLED}$.

During the first cycle 200 of the exemplary timing diagram in FIG. 2C, the select line SEL is high to turn on the switching transistor 118, and the read line RD is low to turn off the read transistor 118. The data line Vdata supplies a voltage Vd2 to node A via the switching transistor 118. During the second cycle 201, SEL is low to turn off the switching transistor 118, and RD is high to turn on the read transistor 119. The monitor line MON supplies a voltage Vref to the node B via the read transistor 118, while a reading of the value of the drive current is taken via the read transistor 119 and the monitor line MON. This read value is compared with the known reference value of the drive current and, if the read value and the reference value of the drive current are different, the cycles 200 and 201 are repeated using an adjusted value of the voltage Vd2. This process is repeated until the read value and the reference value of the drive current are substantially the same, and then the adjusted value of Vd2 can be used to determine $V_{OLED}$.

Figure 3:
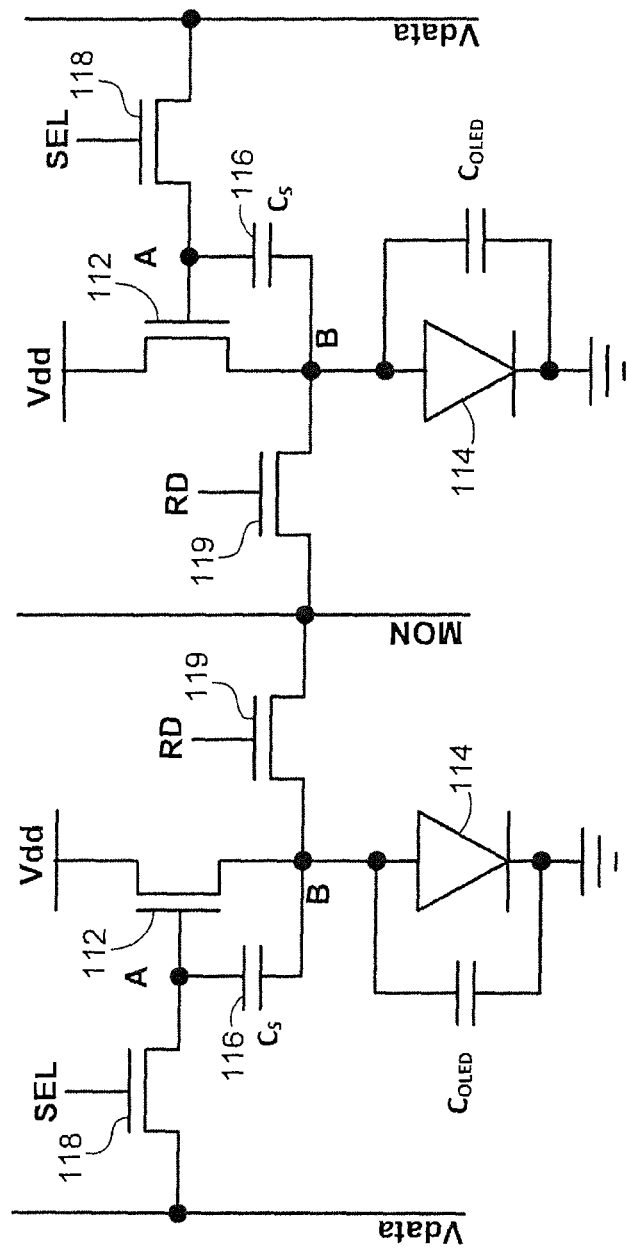
FIG. 3 is a circuit diagram of another exemplary pixel circuit configuration.

FIG. 3 is a circuit diagram of two of the pixels 110a and 110b like those shown in FIG. 2A but modified to share a common monitor line MON, while still permitting independent measurement of the driving current and OLED voltage separately for each pixel. The two pixels 110a and 110b are in the same row but in different columns, and the two columns share the same monitor line MON. Only the pixel selected for measurement is programmed with valid voltages, while the other pixel is programmed to turn off the drive transistor 12 during the measurement cycle. Thus, the drive transistor of one pixel will have no effect on the current measurement in the other pixel.

Figure 4:
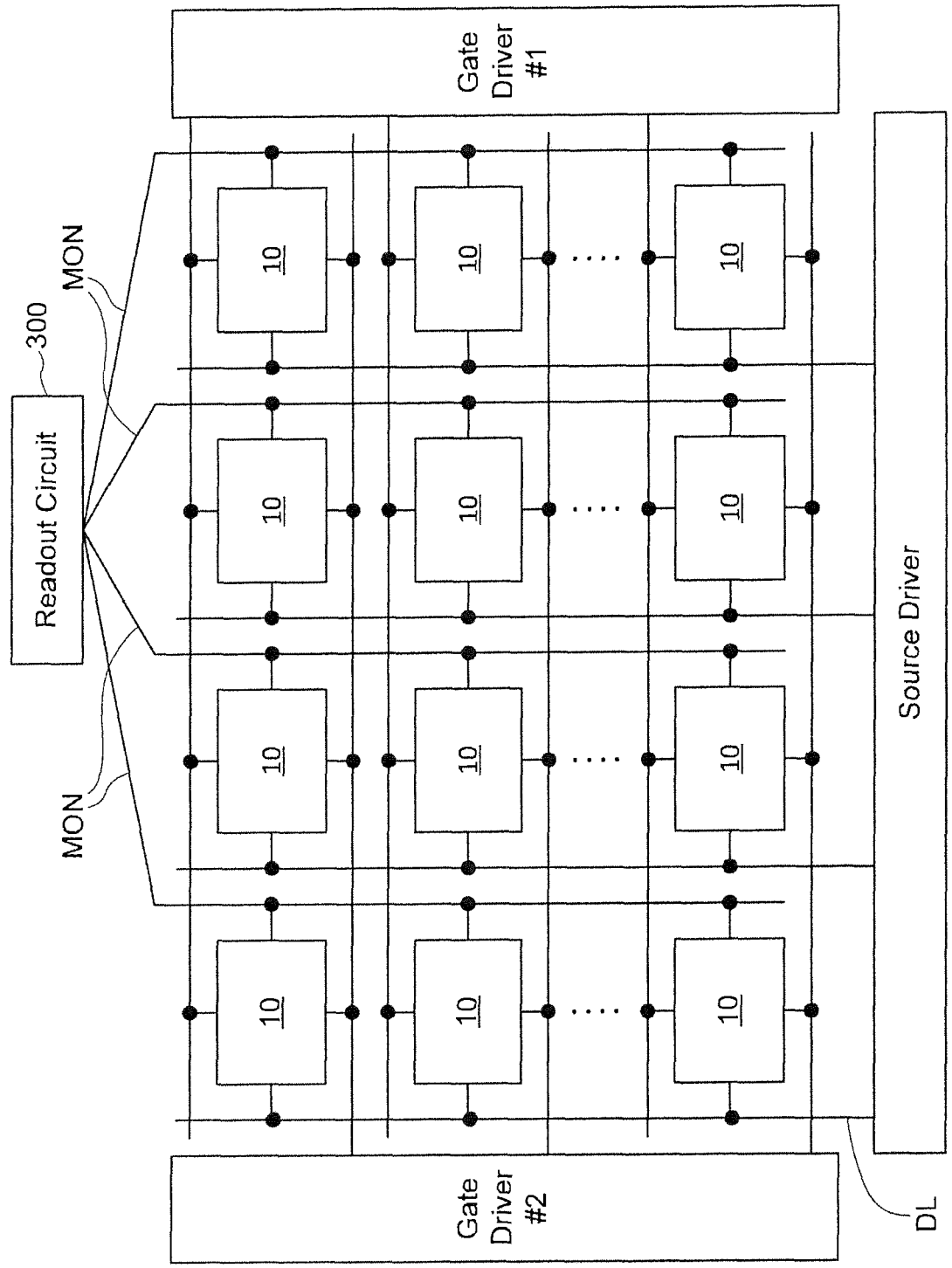
FIG. 4 is a block diagram of a modified configuration of a system for driving an OLED display using a shared readout circuit, while monitoring the degradation of the individual pixels and providing compensation therefor.

FIG. 4 illustrates a modified drive system that utilizes a readout circuit 300 that is shared by multiple columns of pixels while still permitting the measurement of the driving current and OLED voltage independently for each of the individual pixels 10. Although only four columns are illustrated in FIG. 4, it will be understood that a typical display contains a much larger number of columns, and they can all use the same readout circuit. Alternatively, multiple readout circuits can be utilized, with each readout circuit still sharing multiple columns, so that the number of readout circuits is significantly less than the number of columns. Only the pixel selected for measurement at any given time is programmed with valid voltages, while all the other pixels sharing the same gate signals are programmed with voltages that cause the respective drive transistors to be off. Consequently, the drive transistors of the other pixels will have no effect on the current measurement being taken of the selected pixel. Also, when the driving current in the selected pixel is used to measure the OLED voltage, the measurement of the OLED voltage is also independent of the drive transistors of the other pixels.

Figure 5:
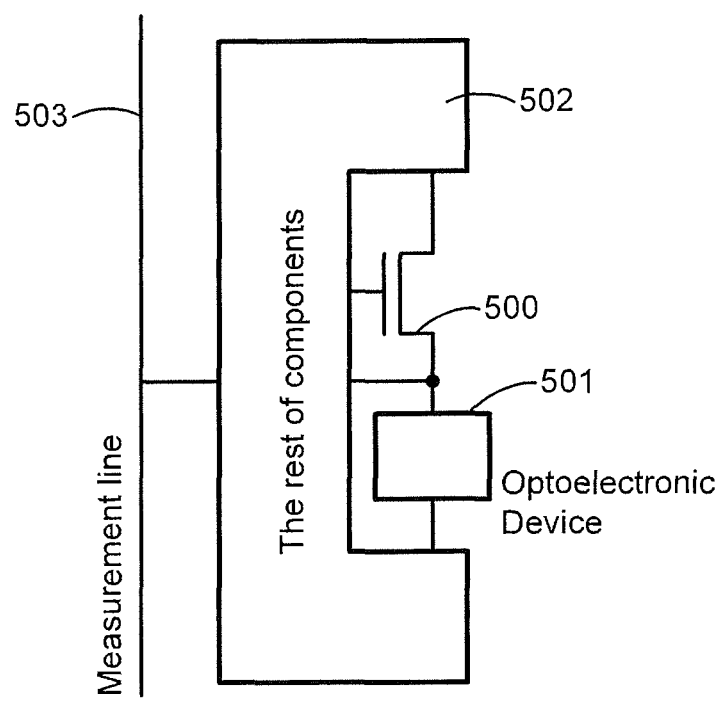
FIG. 5 is a schematic illustration of a pixel circuit having a driving transistor, an optoelectronic device, and a measurement line.

FIG. 5 illustrates one of the pixel circuits in a solid state device that includes an array of pixels. In the illustrative pixel circuit, a drive transistor 500 is connected in series with a load such as an optoelectronic device 501. The rest of the components 502 of the pixel circuit are coupled to a measurement line 503 that allows extraction of the characteristics of the driving part and/or the driven load for further calibration of the performance of the solid-state device. In this example, the optoelectronic device is an OLED, but any other device can be used.

Sharing a measurement (monitor) line with a plurality of columns can reduce the overhead area. However, sharing a monitor line affects the OLED measurements. In most cases, an OLED from one of the adjacent columns using a shared monitor line will interfere with measurement of a selected OLED in the other one of the adjacent columns.

In one aspect of the invention, the OLED characteristics are measured indirectly by measuring the effect of an OLED voltage or current on another pixel element.

In another aspect of the invention, the OLEDs of adjacent pixels with a shared monitor line are forced in a known stage. The selected OLED characteristic is measured in different stages, and the selected OLED characteristic is extracted from the measurement data.

In yet another aspect of the invention, the drive transistor is used to force the OLED samples to a known status. Here, the drive transistor is programmed to a full ON status. In addition, the power supply line can be modified to make the OLED status independent of the drive TFT characteristics. For example, in the case of a pixel circuit with an n-type transistor and the OLED at the source of the drive transistor, the drain voltage of the drive transistor (e.g., the power supply) can be forced to be lower than (or close to) the full ON voltage of the drive TFT. In this case, the drive transistor will act as a switch forcing the OLED voltage to be similar to the drain voltage of the drive TFT.

In a further aspect of the invention, the status of the selected OLED is controlled by the measurement line. Therefore, the measurement line can direct the characteristics of a selected OLED to the measurement circuit with no significant effect from the other OLED connected to the measurement line.

In a still further aspect of the invention, the status of all the OLED samples connected to the shared monitor lines is forced to a known state. The characteristic is measured, and then the selected OLED is set free to be controlled by the measurement line. Then the characteristic of a selected OLED sample is measured. The difference between the two measurements is used to cancel any possible contamination form the unwanted OLED samples.

In yet another aspect of the invention, the voltage of the unwanted OLED samples is forced to be similar to the voltage of the measurement line. Therefore, no current can flow from the OLED lines to the measurement line.

Figure 6:
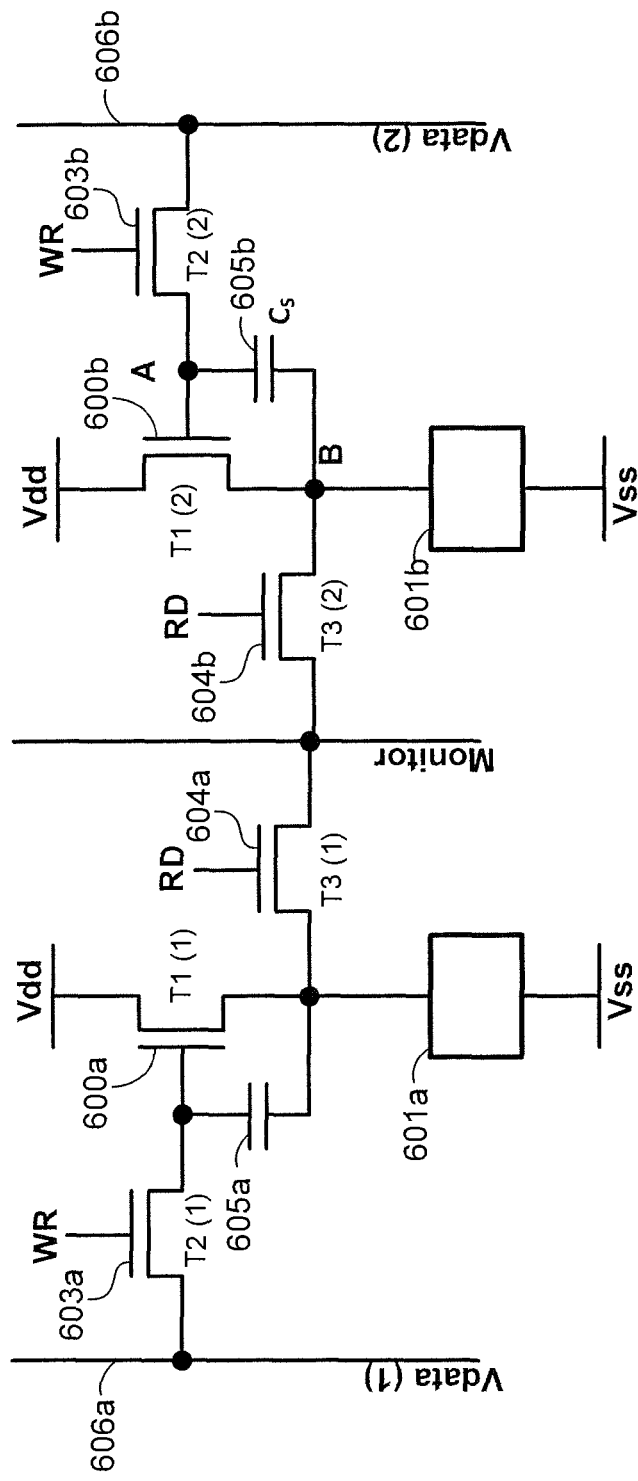
FIG. 6 is a circuit diagram of a pair of pixel circuits having a shared monitor line.

FIG. 6 illustrates a pair of pixel circuits that share a common monitor line 602 for adjacent pixel circuits having respective drive transistors 600a, 600b driving corresponding optoelectronic devices 601a, 601b. The adjacent pixel circuits also have respective write transistors 603a, 603b, read transistors 604a, 604b, storage capacitors 605a, 605b, and data lines 606a, 606b. The methods described above and hereafter can be applied to different pixel circuits, and this is just an example.

During a first phase, the voltage Vdd is set to the voltage of the monitor line, and the drive transistors 600a, 600b are programmed to be in a full ON stage. While the read transistors 604a, 604b are ON, the current through these transistors and the monitor line 602 is measured. This current includes all the leakages to the monitor line and other non-idealities. If the leakage current (and non-idealities) is negligible, this phase can be omitted. Also, the drive voltages Vdd need not be changed if the drive transistors are very strong.

During a second phase, the drive transistor of the selected OLED is set to an OFF stage. Thus, the corresponding optoelectronic device is controlled by the monitor line 602. The current of the monitor line 602 is measured again.

The measurements can highlight the changes in the current of the first optoelectronic device for a fixed voltage on the monitor line. The measurement can be repeated for different OLED voltages to fully characterize the OLED devices.

While the device goes in standby, the display can show some basic information. For example, in some wearable devices (e.g., smart watches or exercise bands) the display shows some content all the time. The main challenge in this case is the power consumption associated with the display. This power includes both static power stemming from the backlight or the emissive device in the pixel and dynamic power associated with refreshing the display.

To reduce the static power, the brightness of the display can be reduced, or only a section of the display can be ON and the rest be OFF (or at lower brightness). This also can help the dynamic power consumption since only a small section of the display needs to be programmed.

Figure 7:
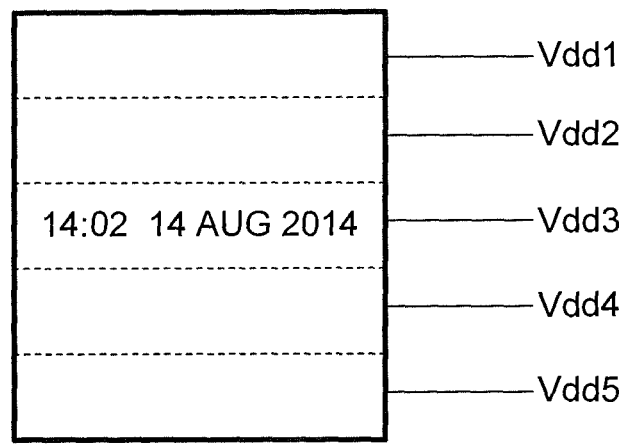
FIG. 7 is a diagrammatic illustration of a display with segmented VDD for power saving.

FIG. 7 illustrates a display with a segmented power supply Vdd1-Vdd5 for power saving. Here each of five different horizontal segments of the display is supplied with a different voltage so that the voltage of each segment can be controlled separately. Each segment can be assigned to a different voltage or disconnected from any voltage levels. For example, during a standby mode, only the 3$^{rd}$ segment may be ON, as depicted in FIG. 7. Therefore only the content for the 3$^{rd}$ segment needs to be transferred to the display, and thus both the dynamic and static power consumption will be reduced by 80%. The display can be segmented either vertically or horizontally, or in both directions, with each segment receiving a separate power supply. In one example, the VDD and VSS can be adjusted in the same direction (horizontal or vertical). In another example, VDD and VSS can be adjusted in different directions (one in horizontal and the other one in vertical). It is also possible to segment in other directions, such as diagonal. Here, the power lines can be connected to different voltage levels through switches or can be disconnected from all the voltages.

One case of power adjustment uses a multiplexer to connect different voltage levels to different segments. In another case, the power supply can be adjusted at the pixel level. In this case, the power supply can be adjusted at vertical or horizontal segments or the combination of the two cases. In one example, the VDD and VSS can be adjusted in the same direction (horizontal, vertical or other directions such as diagonal). In another example, VDD and VSS can be adjusted in different directions (e.g., one horizontal and the other vertical, or in other directions such as diagonal).

Figure 8:
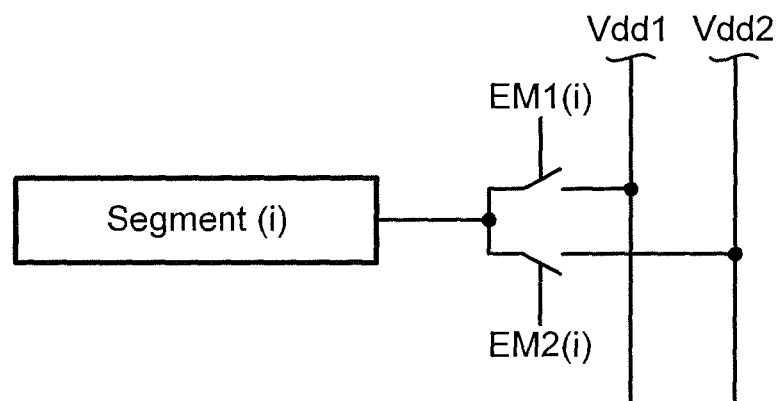
FIG. 8 is a schematic diagram of an electrical circuit for adjusting the power supply at a segment level.

FIG. 8 is a schematic of an electrical circuit for adjusting the power supply at a segment level. Here, a segment (i) can be connected to either of a pair of different voltages Vdd1 and Vdd2 through a pair of controllable switches EM1(i) and EM2(i), or can be disconnected from both the voltages. One case of power supply modification at the pixel level uses emission switches to connect individual pixels, or groups of pixels, to different power supplies. The emission switches may be controlled with a generic signal for each segment. In this case, the power supply can be adjusted at vertical or horizontal segments or a combination of both. In one example, the VDD and VSS can be adjusted in the same direction (horizontal, vertical, diagonal, etc.). In another example, VDD and VSS can be adjusted in different directions (e.g., one in horizontal, the other one in vertical).

Figure 9A:
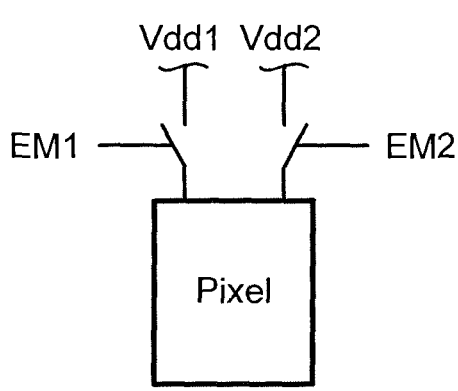
FIG. 9A is a schematic diagram of an electrical circuit for adjusting the power supply to a pixel from Vdd sources.
Figure 9B:
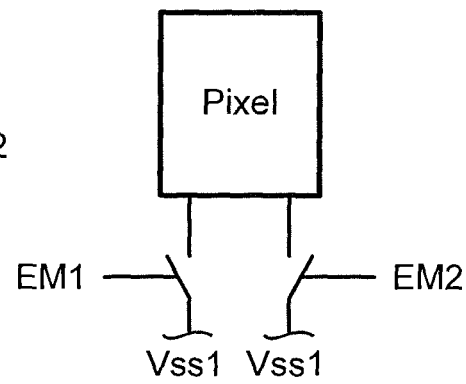
FIG. 9B is a schematic diagram of an electrical circuit for adjusting the power supply to a pixel from Vss sources.

FIGS. 9A and 9B are schematic of electrical circuits for adjusting the power supply at the pixel level. Here, the power lines from Vdd1 and Vdd2 or Vss1 and Vss2 can be connected to different pixels through respective controllable switches EM1 and EM2, or any pixel can be disconnected from the voltages all together.

Figure 10:
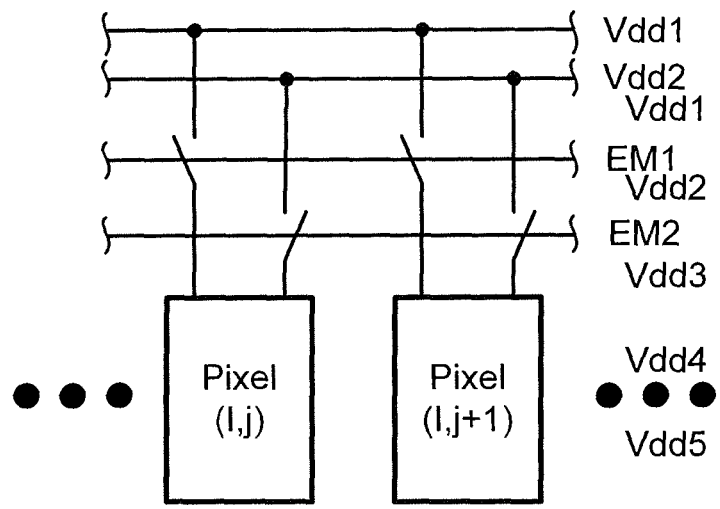
FIG. 10 is a schematic diagram of a pixel arrangement for adjusting the power supply at the pixel level.
Figure 11:
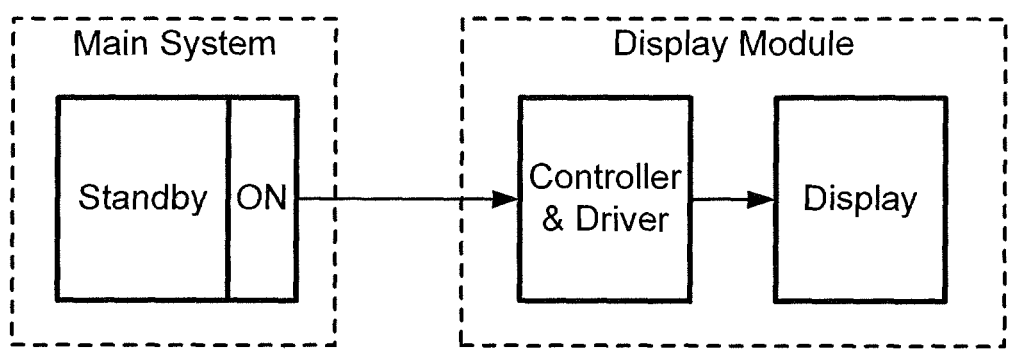
FIG. 11 is a block diagram of a system in standby mode with a display showing active content.

FIG. 10 is a schematic diagram of a pixel arrangement for adjusting the power supply at the pixel level. For dynamic power consumption, one can reduce the refresh rate (frame rate) of the display. However, if the content of the display is changing over time (for example, a watch face) this content needs to be produced and transferred to the display. As a result, part of the main system will be on and there will be power consumption associated with transferring data from the main system to the display. FIG. 11 illustrates a system in standby mode with a display showing active content.

To eliminate the extra power consumption associated with transferring data between the main system and the display during the standby mode, some basic functionality can be added to the display driver to produce recursive changes in the content. For example, the driver can have multiple frame buffers, which are pre-populated by the main system in advance (e.g., before going to the standby mode, or during boot-up or power-up) and depending on different conditions, one of the frame buffers may be used to program the display. For example, a timer can be used to flip between the frame buffers (see FIG. 9). The main issue in this case is that for some applications, such as a watch face, there are many different combinations that will require significantly large memory to store them as full frame buffers.

Figure 12:
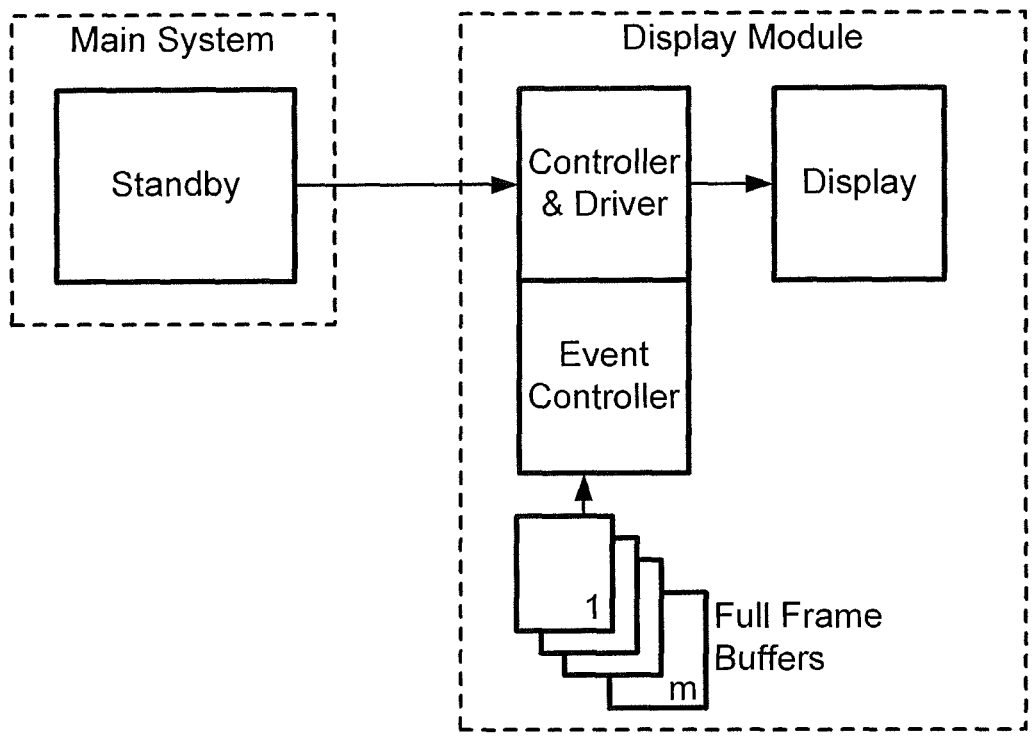
FIG. 12 is a block diagram of a display module with multiple frame buffers for supporting active content during standby.
Figure 13:
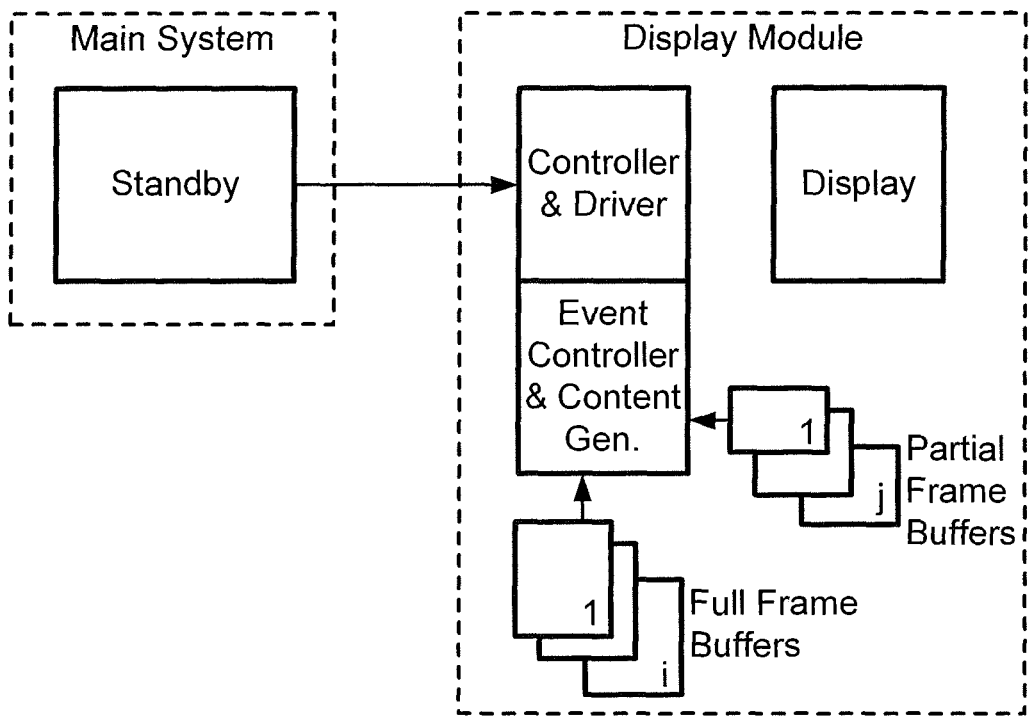
FIG. 13 is a block diagram of a display module with frame buffers and content generation module for supporting active content during standby.

FIG. 12 illustrates a display module with multiple frame buffers for supporting active content during standby. The driver can have a plurality of full frame buffers, and the other partial frame buffers only store the changes applied to one of the full frame buffers based on certain conditions. For example, the hand positions in a watch face can be stored as the changes to the watch face in partial frame buffers, while the watch face itself is stored in the full frame buffer. An exemplary block diagram of a display with a full frame buffer and a partial frame buffer is illustrated in FIG. 13, which shows a display module with frame buffers and a content generation module for supporting active content during standby. Here, the content generator module selects a full frame buffer and a partial frame buffer based on some conditions, and it modifies the image stored in the full frame buffer based on the information in the partial frame buffer. Also, one can use the multiple full and partial frame buffers to create a new content.

Alternatively, the driver can perform some basic calculation such as moving an object by a trajectory. In this case, for different conditions, some part of the image in the full frame buffers is moved based on a trajectory, or the object stored in the partial frame buffer is moved and the main frame buffer is modified by the new calculated object.

Figure 14:
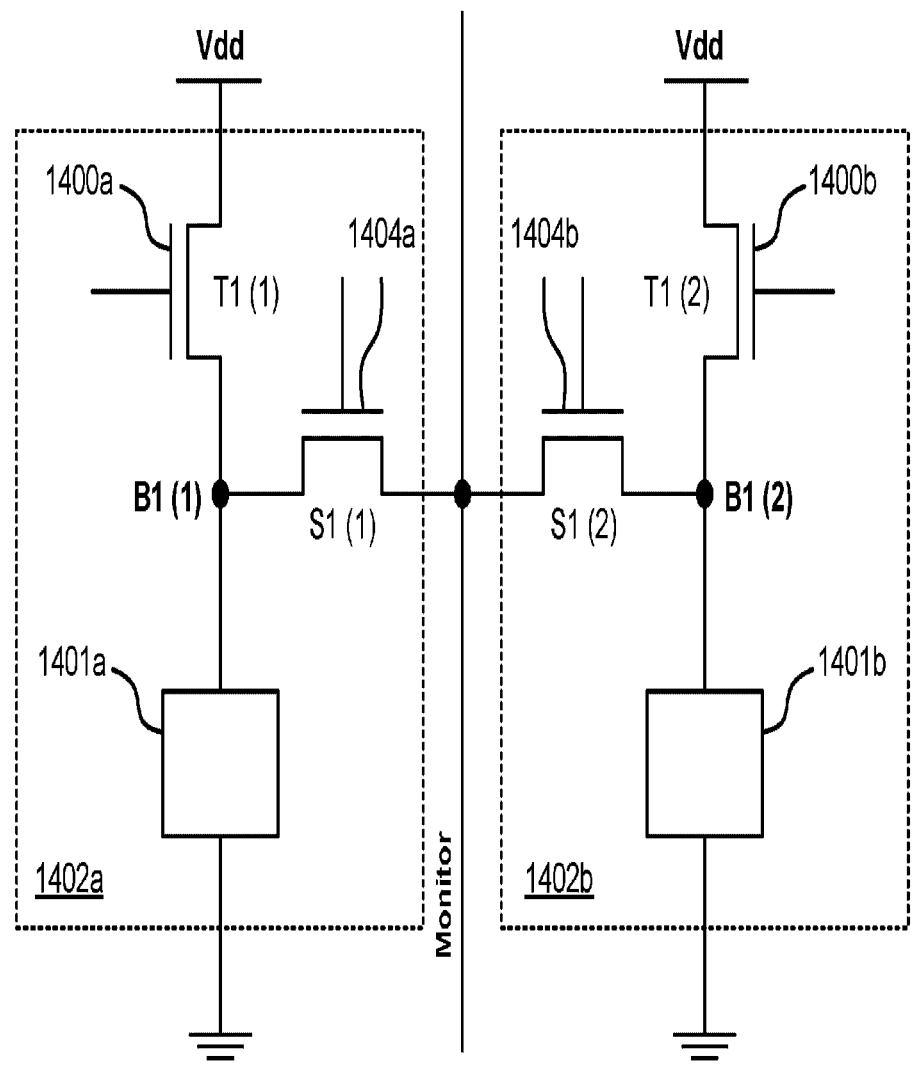
FIG. 14 is a circuit diagram of a pair of pixel circuits having a shared monitor line according to another embodiment.

Referring to FIG. 14, a further embodiment directed to measuring characteristics of optoelectronic devices 1401a, 1401b and drive transistors 1400a, 1400b of pixels 1402a, 1402b which share a monitor line (Monitor) will now be described. Although traditionally it can pose a challenge, sharing a monitor line and/or data lines and/or select lines provides simpler pixels and enables higher yield (more pixels per inch) and higher fill factors.

The first pixel 1402a includes a first drive transistor 1400a having one of a source and a drain terminal coupled to supply voltage VDD, and the other of its source and drain terminals coupled to a first optoelectronic device 1401a which in turn is coupled to ground or alternatively VSS. The second pixel 1402b includes a second drive transistor 1400b having one of its source and drain terminals coupled to supply voltage VDD, and the other of its source and drain terminals coupled to a second optoelectronic device 1401b which in turn is coupled to ground or alternatively VSS. A first node B1 (1) between the first drive transistor 1400a and the first optoelectronic device 1401a is coupled across a first source switch 1404a to the monitor line while a second node B1 (2) between the second drive transistor 1400b and the second optoelectronic device 1401b is coupled across a second source switch 1404b to the monitor line. The first and second optoelectronic devices 1401a, 1401b may be OLEDs and are driven by the drive transistors 1400a, 1400b. For clarity of the principles of operation of the embodiment, not shown in FIG. 14 are storage elements for storing pixel programming data and other elements which may or may not be present. The source switches 1404a, 1404b provide functionality similar to the read transistors of FIG. 3 and FIG. 6 allowing monitoring and biasing of elements of the first and second pixel 1402a, 1402b circuits. In some embodiments the source switches 1404a, 1404b also provide select and write functionality similar to the switching transistors 118, 603a, 603b of FIG. 3 and FIG. 6. In general it should be understood that the methods of embodiments described in association with FIG. 14 are applicable to different pixel circuits.

In one aspect, a drive transistor 1400a, 1400b is used to push the associated optoelectronic device 1401a, 1401b in an off state. In other words, the biasing conditions of pixels that are not being measured are changed so as to force the optoelectronic device 1401a, 1401b of that pixel 1402a, 1402b to be off. For example, when measuring the first pixel 1402a including optoelectronic device 1401a, in the second pixel 1402b, biasing conditions such as control of the state of the drive transistor 1400b, are such that optoelectronic device 1401b turns off. The biasing conditions which control the second drive transistor 1400b include VDD and the voltage applied to the gate of the second drive transistor 1400b. As a result, only the intended device i.e., that being measured (in this example optoelectronic device 1401a) is controlled by the monitor line biasing condition and so the voltage or current or the charge created by the intended device can be measured.

In another aspect, the drive transistor 1400a, 1400b forces the current through the associated source switches 1404a, 1404b to be zero or a fixed known current. In this case, the drive transistor 1400a, 1400b makes the voltage across the source switches 1404a, 1404b connected to the devices not intended for measurement to be zero or of a fixed value known to give rise to the fixed known current. A detailed example implementation of this embodiment is described further below.

In another aspect, the intended pixel for measurement of its optoelectronic device 1404a, 1404b is biased at a few different biasing points. This can be done through programming the pixel with different bias levels and/or the monitor line bias level can be modified. From different bias levels and measurement values, the characteristics of the optoelectronic device can be extracted. This can, for example, be performed for both the first pixel 1402a and the second pixel 1402b simultaneously, involving the variation of various biasing inputs and taking sufficient measurements to solve for the unknowns of the devices being characterized, including up to all of both the drive transistors 1400a, 1400b, and both the optoelectronic devices 1401a, 1401b. In one example embodiment, four biasing conditions, VDD, the gate voltage applied to the first drive transistor 1400a, the gate voltage applied to the second drive transistor 1400b, the signal applied to the gates of the source switches 1404a. 1404b, and a biasing level provided over the monitor line are the five possible inputs and the current of each of the four devices, i.e. of the first and second drive transistors 1400a, 1400b, and of the first and second optoelectronic devices 1401a, 1401b are the four unknowns which are solved.

The measurements in the aforementioned cases can be carried out with direct measurements of the voltage or current, in a comparator based manner, or by adjusting one or more bias conditions to progressively determine bias conditions in one or more devices in the pixels.

One example measurement method which forces the current through the a source switches 1404a, 1404b of a pixel not being measured to be zero or a fixed known current, will now be described as used to measure the first optoelectronic device 1401a, of a selected pixel of interest. In this method, the associated first drive transistor 1400a is turned off and other drive transistors (such as the second drive transistor 1400b) of pixels which share the monitor line but which are not being measured (such as the second pixel 1402b), are turned fully on and act as switches. As a result, the voltage at node B1 (2) in the non-measured pixels is set to equal that of VDD. By arranging for the voltage VDD to be the same as the voltage at the monitor line, the current through the second source switch 1404b will be very small. In cases where VDD at node B1 (2) and the voltage at the monitor line are not the same, the current that is capable of passing through the second source switch 1404b with the voltage difference can be measured first and then that measured fixed known current can be subtracted from the measurements of the pixel of interest. During measurement of the current in response to the voltage difference across the second source switch 1404b, the same voltage difference is applied across the second source switch 1404b in order to produce the small current which later is subtracted from the measurements, but the voltages (VDD and that on the monitor line) are chosen so that optoelectronic devices 1404a, 1404b are off. The gate voltages of the driving transistors 1400a, 1400b, as well as VDD can be manipulated to isolate the small current. For example, with both drive transistors 1400a, 1400b fully on and the optoelectronic devices 1401a, 1401b off by virtue of VDD (and hence the voltage at B1(1) and B1(2)) being low enough, the voltage of the monitor line can be set at the same level as VDD. The first drive transistor 1400a can then be set fully off, and VDD varied to the desired voltage difference from the monitor line (which does not affect B1 (1) because the first drive transistor 1400a is off) to produce a delta current through the second source switch 1404b while the optoelectronic devices 1401a, 1401b remain off. This is the fixed known current through the second source switch 1404b in response to the voltage difference.

In this way, once the various small currents through the second source switch 1404*b* have been isolated and measured for known voltage differences between B1(2) and the monitor line, the first optoelectronic device 1401*a*, of interest is turned on with high enough voltages (monitor line) while, as described above, the first drive transistor 1400*a* is turned off and the second drive transistor 1400*b* is turned on. The current passing through the first source switch is related to that of the first optoelectronic device 1401*a* and can be isolated by subtracting the fixed known current (due to the known voltage difference between the node B1 (2) and the monitor line) through the second source switch 1404*b* from the measurement.

As described in association with other embodiments above, indirect measurement can be made by adjusting the bias on the gate of the drive transistor 1400*a*, 1400*b* of the pixel of interest 1402*a*, 1402*b*, until the current through the associated source switch 1404*a*, 1404*b* is fixed (it can be zero or a non-zero value). In this case, the current passing through the drive transistor 1400*a*, 1400*b* of the pixel of interest in response to biasing would have had to have been measured first, i.e., characterized independently while the associated optoelectronic device 1401*a*, 1401*b* was off. Knowing the change in the current of the drive transistor 1400*a*, 1400*b* (from the change in the voltage applied) which results in the zero or some fixed known current through the associated source switch 1404*a*, 1404*b* gives an indirect change of current through the associated optoelectronic device 1401*a*, 1401*b*.

It should be understood that FIG. 14 shows an example pixel structure with a shared monitor line. The positions of the optoelectronic devices or the types of transistors can be changed without departing from the broad methods described. Although FIG. 14 depicts the monitor line shared between two pixels in a row, it should be understood that it can be shared between more than two. Moreover, the sharing can be implemented at pixel level or at the boundary of array.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A display comprising:
    an array of pixels including a first pixel and a second pixel;
    a monitor line coupled to the first pixel and the second pixel;
    a controller adapted to:
        bias the first pixel;
        bias at least one circuit element of the second pixel to operate in a known state; and
        measure a characteristic of a circuit element of the first pixel with use of said monitor line.

2. The display of claim 1, wherein the controller is adapted to measure the characteristic of the circuit element of the first pixel with use of said monitor line by measuring a current over the monitor line.

3. The display of claim 2, wherein the controller is adapted to measure the characteristic of the circuit element of the first pixel with use of said monitor line by subtracting from a current value of the measured current a current value of a known current generated from said second pixel while said at least one circuit element of the second pixel is operating in the known state.

4. The display of claim 3, wherein the known current is zero.

5. The display of claim 1, wherein the at least one circuit element of the second pixel comprises an optoelectronic device of the second pixel, and wherein the controller is adapted to bias the optoelectronic device to turn off the optoelectronic device.

6. The display of claim 5, wherein the second pixel includes a drive transistor for supplying current to the optoelectronic device and coupled between a supply voltage and the optoelectronic device, and wherein the controller is adapted to bias the optoelectronic device by biasing the drive transistor to set a voltage at a node between the drive transistor and the optoelectronic device to bias the optoelectronic device and turn the optoelectronic device off.

7. The display of claim 1, wherein the at least one circuit element of the second pixel comprises a source switch coupled between the monitor line and remaining elements of the second pixel, and wherein the controller is adapted to bias the source switch.

8. The display of claim 7, wherein the controller is adapted to bias the source switch by biasing with a known voltage difference across a source and a drain of the source switch resulting in the source switch operating in the known state and a known current passing through the source switch.

9. The display of claim 8, wherein the known voltage difference is zero.

10. The display of claim 8, wherein the controller is further adapted to:
    prior to biasing with the known voltage difference across the source and the drain of the source switch, determine the known voltage difference across the source and the drain of the source switch which results in the known current passing through the source switch by:
    biasing the first pixel to turn off an optoelectronic device of the first pixel and then biasing the first pixel to turn off a drive transistor of the first pixel;
    biasing the monitor line to a first voltage and biasing the second pixel so that the known current passes through the source switch as a result of a particular voltage difference across the source and the drain of the source switch; and
    determining the known voltage difference from the particular voltage difference.

11. The display of claim 8, wherein the first pixel includes a drive transistor for supplying current to an optoelectronic device of the first pixel and coupled between a supply voltage and the optoelectronic device, and wherein the controller is adapted to bias the first pixel by biasing the drive transistor to turn the drive transistor off and biasing over the monitor line the optoelectronic device to turn the optoelectronic device on.

12. The display of claim 11, wherein the controller is further adapted to:
    prior to the biasing with the known voltage difference across the source and the drain of the source switch, determine the known voltage difference across the source and the drain of the source switch which results in the known current passing through the source switch by:
    biasing the first pixel to turn off the optoelectronic device and then biasing the first pixel to turn off the drive transistor;

biasing the monitor line to a first voltage and biasing the second pixel so that the known current passes through the source switch as a result of a particular voltage difference across the source and the drain of the source switch; and determining the known voltage difference from the particular voltage difference.

13. The display of claim 1, wherein the controller is further adapted to:

prior to biasing the at least one circuit element of the second pixel, determine a known current which results from said biasing of the at least one circuit element of the second pixel by:

varying a biasing of the at least one circuit element of the second pixel so that the known current passes through the source switch as a result of a particular biasing of the at least one circuit element of the second pixel; and determining the biasing of the at least one circuit element of the second pixel from the particular biasing of the at least one circuit element of the second pixel.

14. The display of claim 1, wherein the first pixel includes a drive transistor for supplying current to an optoelectronic device of the first pixel and coupled between a supply voltage and the optoelectronic device, and wherein the first pixel includes a source switch coupled between the monitor line and remaining elements of the first pixel, and wherein the controller is adapted to bias the first pixel by:

at a first time, biasing the drive transistor to cause a first current to pass through the source switch; and at a second time after the first time, adjusting a biasing of the drive transistor to maintain the same first current passing through the source switch;

determining a change in a current characteristic of the optoelectronic device from the change in the biasing of the drive transistor which maintains the same first current passing through the source switch.

* * * * *